United States Patent [19]

Lenz et al.

[11] Patent Number: 4,532,300
[45] Date of Patent: Jul. 30, 1985

[54] PRODUCTION OF COATINGS

[75] Inventors: Werner Lenz, Bad Durkheim; Hans Sander, Ludwigshafen; Dieter Möller, Ascheberg, all of Fed. Rep. of Germany

[73] Assignee: BASF Aktiengesellschaft, Fed. Rep. of Germany

[21] Appl. No.: 513,024

[22] Filed: Jul. 12, 1983

[30] Foreign Application Priority Data

Jul. 13, 1982 [DE] Fed. Rep. of Germany ....... 3226131

[51] Int. Cl.$^3$ .................. C08F 8/30; C08F 265/00
[52] U.S. Cl. .................... 525/124; 525/265; 525/258; 525/123
[58] Field of Search ............... 525/265, 258, 124, 123

[56] References Cited

U.S. PATENT DOCUMENTS

| 3,542,741 | 11/1970 | Hartmann et al. | 525/123 |
| 3,549,583 | 12/1970 | Nagata et al. | 524/871 |
| 3,919,218 | 11/1975 | Schmitt et al. | 544/222 |
| 3,932,342 | 1/1976 | Nagata et al. | 524/441 |
| 4,145,513 | 3/1979 | Dalibor | 528/75 |
| 4,163,836 | 8/1979 | Dalibor | 528/366 |
| 4,210,702 | 7/1980 | Dalibor | 428/413 |
| 4,246,132 | 1/1981 | Gras | 528/45 |
| 4,293,661 | 10/1981 | Probst | 525/127 |
| 4,306,051 | 12/1981 | Gras et al. | 528/45 |

FOREIGN PATENT DOCUMENTS 1391066 4/1975 United Kingdom .
1515868 6/1978 United Kingdom .

Primary Examiner—John C. Bleutge
Assistant Examiner—A. L. Carrillo
Attorney, Agent, or Firm—Keil & Weinkauf

[57] ABSTRACT

A process for the production of coatings based on reaction products of (A) polyhydroxy polyacrylate resins obtained from hydroxyalkyl esters of acrylic acid and/or methacrylic acid, alkyl acrylates and/or methacrylates, one or more polymerizable, olefinically unsaturated N-containing heterocyclic compounds and if appropriate vinyl-aromatics, acrylamides or methacrylamides and other monomers with (B) isocyanurate-containing polyisocyanates having a functionality of from 2.5 to 6 and predominantly containing cycloaliphatically bonded isocyanate groups is particularly useful for coating metal articles.

36 Claims, No Drawings

PRODUCTION OF COATINGS

The present invention relates to a process for the production of coatings using coating agents which contain, as the binder, reaction products of selected polyhydroxy polyacrylate resins with isocyanurate-containing polyisocyanates which may be partially or completely blocked with CH-, NH- or OH-acidic blocking agents, have a functionality of from 2.5 to 6 and predominantly contain cycloaliphatically bonded isocyanate groups.

German Laid-Open Application DOS No. 1,720,265 discloses a process for the production of light-stable coatings based on reaction products of polyhydroxy polyacrylate resins prepared by copolymerization of monoesters of acrylic acid and/or methacrylic acid with polyfunctional aliphatic alcohols, esters of acrylic acid and/or methacrylic acid with monofunctional aliphatic alcohols and/or other copolymerizable olefinically unsaturated monomers in organic solution. The binder combinations mentioned in the said application and comprising hydroxyl-containing acrylate resins and a biuretized triisocyanate give highly glossy flexible pigmented surface coating films which are very weather-resistant and harden rapidly at low temperatures to give a scratch-resistant coating. However, a disadvantage of these surface coating mixtures is the fact that the biuretized triisocyanates employed tend to split up into the parent monomeric diisocyanates and, in the form of spray mists, are also very toxic when inhaled, so that they are unacceptable from the point of view of industrial hygiene.

German Published Application DAS No. 1,669,008 discloses the use, as a surface coating, of a mixture of a hydroxyl-containing copolymer based on methyl methacrylate, vinyl-aromatics, monoacrylates and/or monomethacrylates of alkanols, other copolymerizable olefinically unsaturated monomers, monomers containing one or more hydroxyl groups in the molecule and a monomer containing tertiary amino groups and one or more polyisocyanates, in organic solution. These surface coating mixtures give hard, scratch-resistant, impact-resistant, weather-resistant films which have good adhesion and high gloss and are resistant to water, solvents and chemicals. The hardeners mentioned in this case include urethane-containing, isocyanurate-containing and biuret-containing aromatic or aliphatic polyisocyanates. However, there is no reference to isocyanurate-containing polyisocyanates which predominantly contain cycloaliphatically bonded isocyanate groups and are substantially acceptable from the point of view of industrial hygiene. Monomers containing tertiary amino groups are stated as being those containing very basic aliphatic tertiary amino groups. Although this accelerates the reaction between the polyisocyanate and the polyol, the surface coating films are expected to have relatively low resistance to acids and a pronounced tendency to yellow on weathering.

German Published Applications DAS No. 1,668,510, DAS No. 2,054,239, DAS No. 2,603,259, DAS No. 2,626,900 and DAS No. 2,659,853 and German Laid-Open Applications DOS No. 2,460,329 and DOS No. 2,851,613 likewise describe processes for the preparation of hydroxyl-containing copolymers in organic solution and for the production of coatings from binders based on these copolymers in combination with aliphatic biuretized triisocyanates. For the copolymers mentioned, the hydroxyl-containing acrylate monomers are reaction products of acrylic acid and/or methacrylic acid with a glycidyl ester of a branched aliphatic carboxylic acid of 4 to 26 carbon atoms and if appropriate hydroxyalkyl acrylates or methacrylates where alkyl is of 2 to 4 carbon atoms, and the comonomers are acrylates and/or methacrylates of alkanols of 1 to 12 carbon atoms and styrene or an alkylstyrene. The introduction of the lateral hydroxyl groups via the glycidyl ester is effected by incorporating acrylic acid and/or methacrylic acid as copolymerized units and at the same time esterifying the carboxyl groups with the glycidyl compound.

These binder combinations, too, give highly glossy, rapidly hardening, scratch-resistant, water-resistant and flexible surface coating films which are very weather-resistant. A disadvantage once again is the fact that in this case too the above biuretized triisocyanates which are not completely acceptable from the point of view of industrial hygiene are used.

German Laid-Open Application DOS No. 2,836,612 describes a process for the production of coatings based on binders comprising biuret-containing, urethane-containing or isocyanurate-containing surface coating polyisocyanates and hydroxyl-containing acrylate copolymers obtained from hydroxyalkyl acrylates or methacrylates where hydroxyalkyl is of 2 to 4 carbon atoms, unsubstituted or substituted styrene and/or methyl methacrylate, acrylates and/or methacrylates where the alcohol radical is of 1 to 12 carbon atoms, mono- or dicarboxylic acids which may or may not be $\alpha,\beta$-monoolefinically unsaturated and acrylonitrile and/or methacrylonitrile. The particular advantages of this process are that these binder combinations give both clear, highly compatible surface coating mixtures and glossy, rapidly drying, hard and sufficiently flexible surface coating films; to realize these advantageous performance characteristics, especially the good compatibility with isocyanurate-containing polyisocyanates, it is absolutely necessary to use from 5 to 30% by weight of acrylonitrile and/or methacrylonitrile as comonomers in the hydroxyl-containing acrylate resin. However, the use of such nitrile-containing copolymers in polyurethane two-component surface coatings leads to substantial yellowing on prolonged thermal loading, and to chalking of the pigmented surface coating films on weathering. The description also mentions that one of the preferred surface coating polyisocyanates which can be used in combination with the acrylate resins is an isocyanurate-containing polyisocyanate based on IPDI, ie. containing predominantly cycloaliphatically bonded isocyanate groups. However, such binder combinations are not described in the Examples, nor does the description of German Laid-Open Application DOS No. 2,836,612 give any indication of the flexibility, the increase in hardness as a function of time, and in particular the gasoline resistance of the surface coating films after a particular curing time, the latter property being extremely important when the coatings are used in automotive repair.

German Laid-Open Application DOS No. 2,900,592 describes reaction products of glycidyl-containing acrylate resins and hydroxyl-containing secondary monoamines. The acrylate resins are random copolymers of glycidyl acrylate and/or methacrylate, vinyl-aromatics, methyl methacrylate, acrylonitrile, methacrylonitrile, acrylates where the alcohol radical is of 1 to 12 carbon atoms and/or methacrylates where the alcohol radical is of 2 to 12 carbon atoms, if appropriate hydroxyalkyl acrylates and/or methacrylates where hydroxyalkyl is of 2 to 4 carbon atoms and mono- and/or dicarboxylic acids which may or may not be α,β-monoolefinically unsaturated, and are used as crosslinking components in combination with polyisocyanates which may furthermore contain isocyanurate groups. The acrylate resin component claimed in the application mentioned hence predominantly contains secondary hydroxyl groups, but necessarily also contains tertiary amino groups, as functional groups. In addition to the good compatibility of these binder combinations with aromatic solvents, the potlives, which are surprisingly long in spite of the presence of the tertiary amino groups, should be particularly singled out. As can be readily seen by the skilled worker, the long potlives of the surface coating mixtures are attributable in particular to the fact that the acrylate resins contain, as reactive groups, virtually only secondary hydroxyl functions. It is therefore also not surprising that the corresponding reaction product which is based on diethanolamine, contains primary hydroxyl groups and is described in the Comparative Example gives, with polyisocyanates, potlives which are excessively low in comparison with the copolymers described in the said German Laid-Open Application. Thus, the process described in the above application does not give acrylate resins which are very suitable for two-component polyurethane surface coatings and which contain relatively large amounts of primary hydroxyl groups in addition to tertiary amino groups. Moreover, in comparison with systems which are free of amino groups, binders consisting of strongly basic amino-containing copolymers have the disadvantages of lower resistance to acids (resistance to acids is absolutely necessary, for example, for topcoats for automotive repair) and pronounced yellowing on prolonged weathering.

German Laid-Open Application DOS No. 3,010,719 relates to a process for the production of metallic effect coatings which have improved weather resistance, using as topcoats clear finishes containing binders in which the polyol component essentially consists of polyesterols which necessarily have a low content of aromatics, and if appropriate polyacrylate polyols, and the polyisocyanate component consists of biuret-containing and/or isocyanurate-containing adducts possessing aliphatic isocyanate groups which may or may not be blocked. The clear finishes described in the said application are in particular very crack-resistant on weathering. It is well known that polyacrylate-polyester mixtures such as those described, inter alia, in the said German Laid-Open Application present problems with regard to the compatibility of the two components; this is also evident from claim 3 of the said German Laid-Open Application, according to which the polyacrylate is present as a stable dispersion of polymer particles in a solution of the polyester polyol. Moreover, the description discloses that such mixtures or dispersions are preferably to be employed when hardening of the coating is carried out under the action of heat, since these conditions give homogeneous clear surface coating films (cf. Example 6; baking temperature: 80° C.). However, surface coatings which are particularly suitable for the automotive repair sector must also be readily curable at room temperature and give homogeneous coatings in this case. Another general disadvantage of the combinations described in the said application and comprising polyester polyols with a low content of aromatics and polyisocyanates is the fact that the surface drying and complete drying of such systems at room temperature are relatively slow in comparison with the polyacrylate polyol/polyisocyanate combinations, which dry rapidly to give gasoline-resistant coatings. Accordingly, the surface coating mixtures stated in the Examples of German Laid-Open Application DOS No. 3,010,719 are hardened exclusively at 80° C., ie. at elevated temperatures.

German Laid-Open Application DOS No. 3,027,776 relates to a process for the preparation of hydroxyl-containing acrylate or methacrylate resins which are modified with ε-caprolactone and can be crosslinked with polyisocyanates. Even when combined with an isocyanurate-containing polyisocyanate based on isophoron diisocyanate and possessing predominantly cycloaliphatically bonded isocyanate groups, these copolymers give hard, weather-resistant, flexible coatings which adhere well to metal and are resistant to water and chemicals. However, the systems described in the said application have the disadvantage that, where cycloaliphatic polyisocyanates are used, they have to be baked at high temperatures (from 110° to 150° C.), ie. they are not suitable for use as coatings in automotive repair. German Laid-Open Application DOS No. 3,137,133 relates to a process for the production of coatings by reacting polyhydroxy polyacrylate or polyhydroxy polymethacrylate resins, prepared from hydroxyalkyl acrylates or methacrylates which contain primary hydroxyl groups and in which the main alkylene chain is of 4 to 11 carbon atoms and special acrylates or methacrylates as comonomers, with isocyanurate-containing polyisocyanates predominantly containing cycloaliphatically bonded isocyanate groups. Owing to the presence of the special polyisocyanates, the surface coatings obtained from the stated components have a very low toxicity when inhaled and give non-yellowing, acid-resistant coatings which are very useful as topcoats for automotive repair and harden at low temperatures and at the same time possess high flexibility, scratch resistance and weather resistance and good final hardness. Although the hardening rate of these surface coating films at room temperature and their gasoline resistance fully satisfy practical requirements, in some cases they do not quite reach the standard of the most advantageous prior art binder systems, for example those based on hydroxyl-containing polyacrylate resins and biuret-containing aliphatic polyisocyanates.

In contrast to the biuretized aliphatic polyisocyanates hitherto preferably used in topcoats for automotive repair, isocyanurate-containing polyisocyanates with predominantly cycloaliphatically bonded isocyanate groups, preferably products obtained by trimerization of 3-isocyanatomethyl-3,5,5-trimethylcyclohexyl isocyanate in accordance with British Pat. No. 1,391,066 and German Laid-Open Application DOS No. 2,325,826 and DOS No. 2,732,662, exhibit, even in the form of aerosols, extremely low toxicity when inhaled; this is very advantageous when the product is used in coatings for automotive repair. In combination with suitable polyols, surface coating films which are very resistant to weathering and to yellowing are also obtained.

If the prior art hydroxyl-containing polyacrylate resins, as described in, for example, the above German Published Applications DAS No. 1,669,008, DAS No. 1,668,510, DAS No. 2,054,239, DAS No. 2,603,259, DAS No. 2,626,900 and DAS No. 2,659,853 and German Laid-Open Applications DOS No. 2,460,329 and DOS No. 2,851,613 (ie. those based on hydroxyalkyl acrylates and/or methacrylates where the main chain of the alcohol radical is of 2 or 3 carbon atoms, if appropriate in combination with adducts of glycidyl esters of a branched aliphatic monocarboxylic acid with acrylic acid and/or methacrylic acid), are combined with these isocyanurate-containing cycloaliphatic polyisocyanates, the surface coating films obtained within hardening times used in practice and at all hardening temperatures from room temperature to 80° C. which are usually employed for coating in the automotive repair sector possess unsatisfactory mechanical properties and in some cases inadequate gasoline resistance. If the acrylate resins used have high hydroxyl numbers (>100) and consist predominantly of monomers which give homopolymers having a high glass transition temperature (>20° C.), the surface coating films obtained under hardening conditions usually employed in practice (about 7 days at room temperature or not more than 30-60 minutes at 80° C.) are sufficiently scratch-resistant and in some cases sufficiently gasoline-resistant but are much too brittle, ie. they do not satisfy practical requirements. The use of acrylate resins having low hydroxyl numbers (<100) and containing large amounts of monomer units which give homopolymers having a low glass transition temperature (<5° C.) accordingly leads to surface coating films which are sufficiently flexible, but the scratch resistance and gasoline resistance of these films are not sufficiently high for practical use. When larger amounts of catalyst are used, some of the films obtained have both improved flexibility and improved scratch resistance, but they do not harden to a gasoline-resistant coating sufficiently rapidly. Moreover, the potlives of the corresponding surface coating mixtures are too short.

Like the abovementioned combinations, two-component surface coatings comprising the polyhydroxypolyacrylate resins described in German Laid-Open Application DOS No. 1,720,265 and isocyanurate-containing cycloaliphatic polyisocyanates lead to films which possess inadequate flexibility. When the polyhydroxy polyacrylates described in German Laid-Open Application DOS No. 2,836,612, which inevitably contain nitrile side groups, are combined with polyisocyanates which contain isocyanurate groups and predominantly cycloaliphatically bonded isocyanate groups, the products which result, as mentioned above, are surface coating films which have a strong tendency to yellowing and insufficient weather resistance and are useless as topcoats in automotive repair. In combination with the above polyisocyanates, the acrylate resins which are claimed in German Laid-Open Application DOS No. 2,900,592 and inevitably possess both hydroxyl and tertiary amino groups entail, as mentioned above, problems particularly with regard to adequate acid resistance of the surface coating films.

As stated above, the combinations which are disclosed in German Laid-Open Applications DOS No. 3,010,719 and DOS No. 3,027,776 and comprise polyester polyols, hydroxyl-containing acrylate resins or ε-caprolactone-modified hydroxyl-containing polyacrylates or polymethacrylates on the one hand and cycloaliphatic polyisocyanates on the other hand are not very suitable for use in topcoats for automotive repair, particularly because of the relatively high baking temperatures required and the slow surface drying.

Binders which are described in German Laid-Open Application DOS No. 3,137,133 and which comprise special hydroxyl-containing polyacrylates and isocyanurate-containing polyisocyanates with predominantly cycloaliphatically bonded isocyanate groups are very useful per se for the automotive repair sector; however, more rapid hardening of the surface coating films at room temperature coupled with improved gasoline resistance would be desirable.

It is an object of the present invention to provide a novel process for the production of coatings, wherein the binders used are based on isocyanurate-containing polyisocyanates having a functionality of from 2.5 to 6, preferably from 3 to 5, and predominantly containing cycloaliphatically bonded isocyanate groups and hydroxyl-containing polyacrylates resins in organic solution, and do not possess the stated technical disadvantages, ie. starting from surface coating mixtures having a sufficiently long potlife, at low temperatures and without the addition of a catalyst, the films obtained are non-yellowing and harden rapidly to give a gasoline-resistant coating, and at the same time possess high flexibility, scratch resistance and weather resistance or resistance to chalking.

For the purposes of the present invention, functionality is the average number of blocked or non-blocked reactive isocyanate groups per polyisocyanate molecule.

We have found, surprisingly, that this object is achieved by coatings based on the reaction product of a polyisocyanate which has a functionality of from 2.5 to 6, preferably from 3 to 5, possesses predominantly cycloaliphatically bonded isocyanate groups and contains isocyanurate groups, none, some or all, preferably none, of these groups being blocked, with a hydroxyl-containing polyacrylate having a special composition.

The present invention relates to a process for the production of coatings based on a reaction product of
(A) a polyhydroxy polyacrylate resin comprising esters of acrylic acid or methacrylic acid with monofunctional aliphatic alcohols, monoesters of acrylic acid or methacrylic acid with polyfunctional aliphatic alcohols and other copolymerizable olefinically unsaturated monomers with
(B) isocyanurate-containing polyisocyanates which have a functionality of from 2.5 to 6 and which may be partially or completely blocked with CH-, NH- or OH-acidic blocking agents,
wherein the polyhydroxypolyacrylate resin (A) used is a hydroxyl-containing copolymer comprising
(a) from 6 to 70% by weight of one or more esters of the general formula

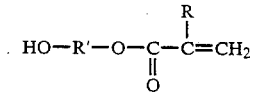

where R is hydrogen or methyl, R' is straight-chain or branched alkylene of 2 to 18 carbon atoms or an alkylene radical of 7 to 17 carbon atoms which contains not more than three cycloaliphatic groups, and, if appropriate, some or all of the groups HO—R'— can be replaced by the group Z—O—R'—, where Z is a radical of the general formula

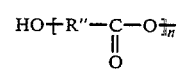

where n is an integer from 1 to 3 and R'' is an alkylene chain of 4 to 8 carbon atoms which may additionally contain from 1 to 3 alkyl substituents having in total not more than 10 carbon atoms or a cycloaliphatic radical of 6 to 10 carbon atoms or an unsubstituted or alkyl-substituted aromatic radical of 6 to 8 carbon atoms and/or an araliphatic radical of 7 to 9 carbon atoms or an alkoxy radical of 1 to 8 carbon atoms, (b) from 0 to 40% by weight of from 0 to 50% by weight, respectively, of one or more hydroxyalkyl esters of acrylic acid or methacrylic acid of the general formula

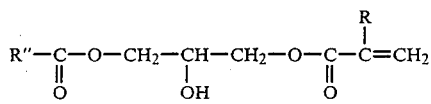

where R is hydrogen or methyl and R'' is an alkyl radical of a branched aliphatic carboxylic acid of 4 to 26 carbon atoms, (c) from 10 to 50% by weight of one or more alkyl acrylates or methacrylates which form homopolymers having glass transition temperatures of from +5° C. to +120° C., (d) from 0 to 10% by weight of a vinyl-aromatic, (e) from 10 to 60% by weight of one or more alkyl esters, or alkylglycol esters containing not more than 2 etheroxygen bridges, of acrylic acid or methacrylic acid, which esters form homopolymers having glass transition temperatures of from −80° C. to +4.5° C., (f) from 0 to 10% by weight of an acrylamide or methacrylamide which may or may not be substituted at the amide nitrogen by one or two alkyl radicals of 1 to 8 carbon atoms, which may contain a carbonyl group, or by one or two phenyl radicals, (g) from 1 to 25% by weight of one or more polymerizable, olefinically unsaturated, heterocyclic compounds of the general formulae (I) to (VIII)

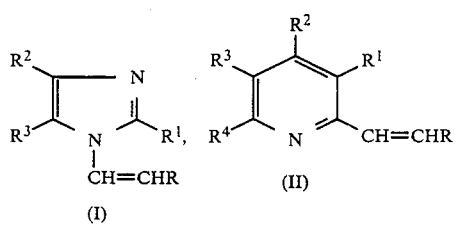

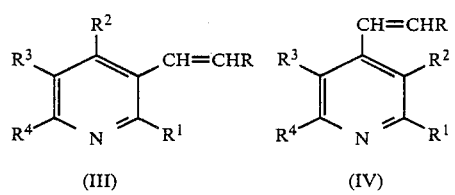

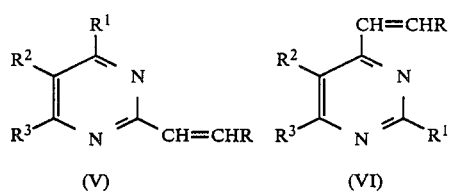

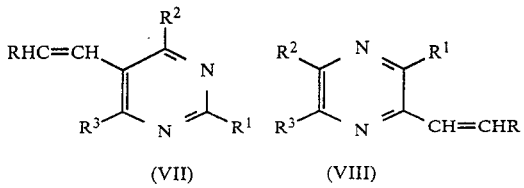

where R is hydrogen or methyl and $R^1$, $R^2$, $R^3$ and $R^4$ are identical or different and are each hydrogen, methyl, ethyl, straight-chain or branched alkyl of 3 or 4 carbon atoms, phenyl which is unsubstituted or substituted by alkyl of 1 to 4 carbon atoms, halogen or nitro, a group of the general formula $-R^I-A-R^{II}$, where A is oxygen or sulfur, $R^I$ is methylene or ethylene or is phenylene which is unsubstituted or substituted by alkyl of 1 to 4 carbon atoms, halogen or nitro, and $R^{II}$ is methyl or ethyl or is phenyl which is unsubstituted or substituted by alkyl of 1 to 4 carbon atoms, halogen or nitro, or $R^1$, $R^2$, $R^3$ and $R^4$ are each halogen, nitro or a group of the general formula $-OR^{III}$, $-COOR^{III}$, $-SO_2R^{III}$, $-CONR^{III}R^{IV}$ or $-SO_2NR^{III}R^{IV}$, where $R^{III}$ and $R^{IV}$ are identical or different and are each methyl, ethyl, a straight-chain or branched alkyl radical of 3 or 4 carbon atoms or phenyl which is unsubstituted or substituted by alkyl of 1 to 4 carbon atoms, halogen or nitro, and furthermore, $R^2$ and $R^3$ in formulae (I), (II), (III), (V), (VI) and (VIII) or $R^3$ and $R^4$ in formula (III), and either $R^3$ and $R^4$ or $R^1$ and $R^2$ or $R^3$ and $R^4$ as well as $R^1$ and $R^2$ in formulae (II) and (IV), together with the heterocyclic structure, can form a fused six-membered aromatic ring which is unsubstituted or substituted by alkyl of 1 to 4 carbon atoms, halogen or nitro, and (h) from 0 to 20% by weight of monomers which are not mentioned under (a) to (g) and whose copolymerized radicals are inert to isocyanate groups, with the proviso that the sum of the percentages stated under (a) and (b) is from 6 to 70, the sum of the percentages stated under (c), (d) and (g) is from 10 to 60 and the sum of the percentages of the components stated under (a) to (h) is 100, and the isocyanurate-containing polyisocyanate (B) with a functionality of from 2.5 to 6 is one which predominantly contains cycloaliphatically bonded isocyanate groups.

A preferably used cycloaliphatic isocyanurate-containing polyisocyanate (B) is a product obtained from 3-isocyanatomethyl-3,5,5-trimethylcyclohexyl isocyanate as the monomeric diisocyanate, while a preferred hydroxyl-containing copolymer (A) is one which has a hydroxyl number of from 30 to 250, preferably from 50 to 150. Moreover, the proportions of the reactants (A) and (B) of the coating system are preferably chosen such that the ratio of the number of equivalents of isocyanate groups which may be partially or completely blocked with CH—, NH— or OH— acidic blocking agents to the number of equivalents of reactive hydroxyl groups is from 0.25:1 to 4:1.

Regarding the reaction products used for the novel process, and their building blocks, the following may be stated specifically:

(A) suitable polyhydroxy polyacrylate resins (A) are hydroxyl-containing copolymers of (a) from 6 to 70% by weight of one or more esters of the general formula

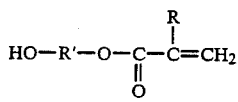

where R is hydrogen or methyl, R' is straight-chain or branched alkylene of 2 to 10 carbon atoms or an alkylene radical of 7 to 17 carbon atoms which contains not more than three cycloaliphatic groups, and, if appropriate, some or all of the groups HO—R'— can be replaced by the group Z—O—R'—, where Z is a radical of the general formula

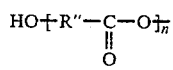

where n is an integer from 1 to 3 and R" is an alkylene chain of 4 to 8 carbon atoms which may additionally contain from 1 to 3 alkyl substituents having in total not more than 10 carbon atoms and/or a cycloaliphatic radical of 6 to 10 carbon atoms and/or an unsubstituted or alkyl-substituted aromatic radical of 6 to 8 carbon atoms and/or an araliphatic radical of 7 to 9 carbon atoms or an alkoxy radical of 1 to 8 carbon atoms, (b) from 0 to 40% by weight or from 0 to 50% by weight, respectively, of one or more hydroxyalkyl esters of acrylic acid or methacrylic acid of the general formula

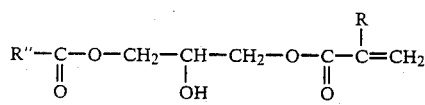

where R is hydrogen or methyl and R" is an alkyl radical of a branched aliphatic carboxylic acid of 4 to 26 carbon atoms, (c) from 10 to 50% by weight of one or more alkyl acrylates or methacrylates which form homopolymers having glass transition temperatures of from +5° C. to +120° C., (d) from 0 to 10% by weight of a vinyl-aromatic, (e) from 10 to 60% by weight of one or more alkyl esters, or alkylglycol esters containing not more than 2 ether-oxygen bridges, of acrylic acid or methacrylic acid, which esters form homopolymers having glass transition temperatures of from −80° C. to +4.5° C., (f) from 0 to 10% by weight of an acrylamide or methacrylamide which may or may not be substituted at the amide nitrogen by one or two alkyl radicals of 1 to 8 carbon atoms, which may contain a carbonyl group, or by one or two phenyl radicals, (g) from 1 to 25% by weight of one or more polymerizable, olefinically unsaturated, heterocyclic compounds of the general formulae (I) to (VIII)

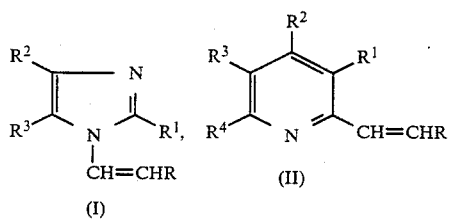

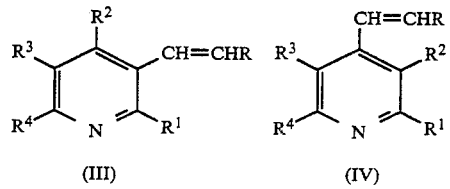

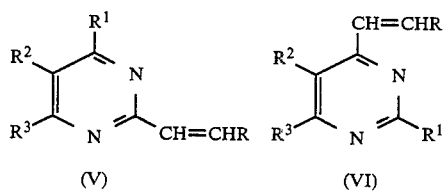

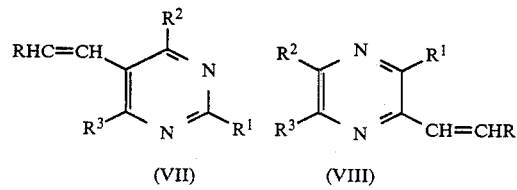

where R is hydrogen or methyl and $R^1$, $R^2$, $R^3$ and $R^4$ are identical or different and are each hydrogen, methyl, ethyl, straight-chain or branched alkyl of 3 or 4 carbon atoms, phenyl which is unsubstituted or substituted by alkyl of 1 to 4 carbon atoms, halogen or nitro, a group of the general formula $-R^I-A-R^{II}$, where A is oxygen or sulfur, $R^I$ is methylene or ethylene or is phenylene which is unsubstituted or substituted by alkyl of 1 to 4 carbon atoms, halogen or nitro, and $R^{II}$ is methyl or ethyl or is phenyl which is unsubstituted or substituted by alkyl of 1 to 4 carbon atoms, halogen or nitro, or $R^1$, $R^2$, $R^3$ and $R^4$ are each halogen, nitro or a group of the general formula $-OR^{III}$, $-COOR^{III}$, $-SO_2R^{III}$, $-CONR^{III}R^{IV}$ or $-SO_2NR^{III}R^{IV}$, where $R^{III}$ and $R^{IV}$ are identical or different and are each methyl, ethyl, a straight-chain or branched alkyl radical of 3 or 4 carbon atoms or phenyl which is unsubstituted or substituted by alkyl of 1 to 4 carbon atoms, halogen or nitro, and furthermore, $R^2$ and $R^3$ in formulae (I), (II), (III), (V), (VI) and (VIII) or $R^3$ and $R^4$ in formula (III), and either $R^3$ and $R^4$ or $R^1$ and $R^2$ or $R^3$ and $R^4$ as well as $R^1$ and $R^2$ in formulae (II) and (IV), together with the heterocyclic structure, can form a fused six-membered aromatic ring which is unsubstituted or substituted by alkyl of 1 to 4 carbon atoms, halogen or nitro, and (h) from 0 to 20% by weight of monomers which are not mentioned under (a) to (g) and whose copolymerized radicals are inert to isocyanate groups, with the proviso that the sum of the percentages stated under (a) and (b) is from 6 to 70, the sum of the percentages stated under (c), (d) and (g) is from 11 to 60 and the sum of the percentages of the components stated under (a) to (h) is 100.

(a) Examples of suitable esters of the general formula

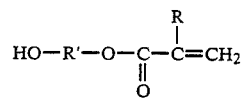

where R is hydrogen or methyl, R' is straight-chain or branched alkylene of 2 to 18 carbon atoms where the main chain is of 2 to 10 carbon atoms or an alkylene radical of 7 to 17 carbon atoms which contains not more than three cycloaliphatic groups, and, if appropriate, some or all of the groups HO—R'— can be replaced by the group Z—O—R'—, where Z is a radical of the general formula

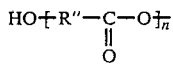

where n is an integer from 1 to 3 and R'' is an alkylene chain of 4 to 8 carbon atoms which may additionally contain from 1 to 3 alkyl substituents having in total not more than 10 carbon atoms and/or a cycloaliphatic radical of 6 to 10 carbon atoms and/or an unsubstituted or alkyl-substituted aromatic radical of 6 to 8 carbon atoms and/or an araliphatic radical of 7 to 9 carbon atoms and/or an alkoxy radical of 1 to 8 carbon atoms, are monoesters of dihydric alcohols, such as decane-1,10-diol, octane-1,8-diol, pentane-1,5-diol, 1,4-dihydroxymethylcyclohexane, 3(4),8(9)-dihydroxymethyltricyclo[5.2.1.0$^{2.6}$]decane, 2,2-dimethylpropane-1,3-diol, butane-1,4-diol, hexane-1,6-diol, propane-1,2-diol or ethane-1,2-diol, with acrylic acid or methacrylic acid, eg. decane-1,10-diol monoacrylate, decane-1,10-diol monomethacrylate, octane-1,8-diol monoacrylate, octane-1,8-diol monomethacrylate, pentane-1,5-diol monoacrylate, pentane-1,5-diol monomethacrylate, 1,4-dihydroxymethylcyclohexane monoacrylate, 1,4-dihydroxymethylcyclohexane monomethacrylate, 3(4),8(9)-dihydroxymethyltricyclo[5.2.1.0$^{2.6}$]decane monoacrylate and monomethacrylate, 2,2-dimethylpropane-1,3-diol monoacrylate and monomethacrylate, butane-1,4-diol monomethacrylate, hexane-1,6-diol monomethacrylate, 2-hydroxypropyl acrylate, 2-hydroxypropyl methacrylate and preferably hydroxyethyl acrylate, hydroxyethyl methacrylate, butane-1,4-diol monoacrylate, butane-1,4-diol monomethacrylate, and hexane-1,6-diol monoacrylate or hexane-1,6-diol monomethacrylate.

Other suitable products are those which can be obtained by reacting the above hydroxyl-containing acrylates or methacrylates with unsubstituted or substituted lactones having 4 to 8 carbon atoms in the ring, these reactants being employed in a molar ratio of from 1.5:1 to 1:3. Examples of lactones employed for this purpose are δ-valerolactone, γ,γ-dimethylvalerolactone, ε-caprolactone, α-,β-,γ-,δ- and ε-methyl-ε-caprolactone, the corresponding monoethyl-, monopropyl-, monoisopropyl- and monooctyl-ε-caprolactones, β,δ-dimethyl-, γ,γ-dimethyl-, β,δ,δ-trimethyl-, β-methyl-δ-ethyl-, γ-cyclohexyl- and γ-phenyl-ε-caprolactone, ζ-enantholactone and η-caprylolactone, ε-caprolactone being particularly preferred.

Preferred lactone adducts are the reaction products of hydroxyethyl acrylate and/or methacrylate and/or 2-hydroxypropyl acrylate and/or methacrylate and/or butane-1,4-diol monoacrylate and/or hexane-1,6-diol monoacrylate and/or butane-1,4-diol monomethacrylate and/or hexane-1,6-diol monomethacrylate with ε-caprolactone in a molar ratio of from 1.5:1 to 1:3, and the adducts based on hydroxyethyl acrylate and/or methacrylate, 2-hydroxypropyl acrylate and/or methacrylate and butane-1,4-diol monoacrylate and/or monomethacrylate are particularly preferred. It is of course also possible to employ, as hydroxyl-containing acrylates or methacrylates, mixtures of the stated lactone adducts with the above hydroxyalkyl acrylates or methacrylates in any desired ratio from 1:99 to 99:1. The unsaturated lactone adducts can be prepared by a conventional process, eg. as described in German Laid-Open Application DOS No. 3,027,776, for example by reacting hydroxyl-containing acrylates or methacrylates with ε-caprolactone in a ratio of equivalents of from 1.5:1 to 1:3, at from 60° to 130° C. in the presence of from 0.01 to 0.15% by weight of an organo-tin catalyst, eg. dibutyl-tin oxide or dibutyl-tin diacetate, while passing air through.

Copolymer (A) used according to the invention contains component (a) as copolymerized units in an amount of from 6 to 70, preferably from 6 to 50, % by weight.

(b) Examples of suitable hydroxyalkyl acrylates or methacrylates of the general formula

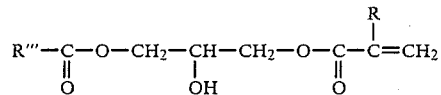

where R is hydrogen or methyl and R''' is an alkyl radical of a branched carboxylic acid of 4 to 26 carbon atoms, are trimethylacetylglycidyl acrylate and methacrylate and versatylglycidyl acrylate and methacrylate, as well as mixtures of these hydroxyalkyl acrylates and methacrylates.

The polyhydroxy polyacrylate resin (A) can contain component (b) as copolymerized units in an amount of from 0 to 50 or from 0 to 40, preferably from 0 to 25, % by weight. The sum of the percentages stated under (a) and (b) is from 6 to 70, preferably from 6 to 50, % by weight.

(c) Examples of suitable alkyl acrylates or methacrylates which form homopolymers having glass transition temperatures of from +5° to +120° C. are methyl acrylate, methyl methacrylate, ethyl methacrylate, tert.-butyl acrylate, n-butyl methacrylate and i-butyl methacrylate as well as mixtures of these; methyl methacrylate and tert.-butyl acrylate are preferred.

Copolymer (A) used according to the invention contains component (c) as copolymerized units in an amount of from 10 to 50, preferably from 25 to 50, % by weight.

(d) Examples of suitable vinyl-aromatics are styrene, -methylstyrene, o- and p-chlorostyrene, o-, m- and p-methylstyrene and p-tert.-butylstyrene as well as mixtures of these; styrene is preferred.

The polyhydroxy polyacrylate resin (A) can contain the vinyl-aromatics (d) as copolymerized units in amounts of from 0 to 10, preferably from 0 to 7, % by weight.

The sum of the percentages stated under (c) and (d) is in general from 10 to 50, preferably from 25 to 50, % by weight.

(e) Examples of suitable alkyl esters, and alkylglycol esters containing not more than 2 ether oxygen bridges, of acrylic acid or methacrylic acid, which esters form homopolymers having glass transition temperatures of from −80° to +4.5° C. are ethyl acrylate, n-butyl acrylate, i-butyl acrylate, 2-ethylhexyl acrylate, 2-ethylhexyl methacrylate, ethylglycol acrylate, ethylglycol methacrylate, ethyldiglycol acrylate, ethyldiglycol methacrylate, lauryl acrylate and lauryl methacrylate as well as mixtures of these; n-butyl acrylate and i-butyl acrylate are preferred.

The copolymer (A) used according to the invention contains component (e) as copolymerized units in an amount of from 10 to 60, preferably from 20 to 50, % by weight.

(f) Examples of suitable acrylamides or methacrylamides which are unsubstituted or substituted at the amide nitrogen by one or two alkyl radicals of 1 to 8 carbon atoms which may contain a carbonyl group, or by one or two phenyl radicals are acrylamide, methacrylamide, N-methylacrylamide, N-methylmethacrylamide, N-ethylacrylamide, N-isopropylacrylamide, N,N-dimethylacrylamide, N,N-diethylacrylamide, N,N-diisopropylacrylamide, N-phenylacrylamide, N,N-di-n-butylacrylamide and N-(1,1-dimethyl-3-oxobutyl)-acrylamide (=diacetoneacrylamide); acrylamide and methacrylamide are preferred.

The polyhydroxy polyacrylate resin (A) can contain component (f) as copolymerized units in an amount of from 0 to 10, preferably from 0 to 5, % by weight.

(g) Examples of suitable polymerizable, olefinically unsaturated, heterocyclic compounds of the above general formulae (I) or (VIII), where R is hydrogen or methyl and $R^1$, $R^2$, $R^3$ and $R^4$ are identical or different and are each hydrogen, methyl, ethyl, straight-chain or branched alkyl of 3 or 4 carbon atoms, phenyl which is unsubstituted or substituted by alkyl of 1 to 4 carbon atoms, halogen, eg. chlorine or bromine, or nitro, a group of the general formula $-R^I-A-R^{II}$, where A is oxygen or sulfur, $R^I$ is methylene or ethylene or is phenylene which is unsubstituted or substituted by alkyl of 1 to 4 carbon atoms, halogen or nitro, and $R^{II}$ is methyl or ethyl or is phenyl which is unsubstituted or substituted by alkyl of 1 to 4 carbon atoms, halogen or nitro, or $R^1$, $R^2$, $R^3$ and $R_4$ are each halogen, nitro or a group of the general formula $-OR^{III}$, $-COOR^{III}$, $-SO_2R^{III}$, $-CONR^{III}R^{IV}$ or $-SO_2NR^{III}R^{IV}$, where $R^{III}$ and $R^{IV}$ are identical or different and are each methyl, ethyl, a straight-chain or branched alkyl radical of 3 or 4 carbon atoms or phenyl which is unsubstituted or substituted by alkyl of 1 to 4 carbon atoms, halogen or nitro, and furthermore, $R^2$ and $R^3$ in formulae (I), (II), (III), (V), (VI) and (VIII) or $R^3$ and $R^4$ in formula (III), and either $R^3$ and $R^4$ or $R^1$ and $R^2$ or $R^3$ and $R^4$ as well as $R^1$ and $R^2$ in formulae (II) and (IV), together with the heterocyclic structure, can form a fused six-membered aromatic ring which is unsubstituted or substituted by alkyl of 1 to 4 carbon atoms, halogen, eg. chlorine or bromine, or nitro, are N-vinylimidazoles, such as 1-vinyl-2-methylimidazole, 1-vinyl-2-phenylimidazole, 1-vinylbenzimidazole, 1-vinyl-2-ethylimidazole, 1-propenyl-2-methylimidazole, 1-vinyl-4-methylimidazole, 1-vinyl-2-ethyl-4-methylimidazole, 1-vinyl-4-nitroimidazole, 1-vinylimidazole and 1-propenylimidazole as well as mixtures of these; 1-vinylimidazole, 1-vinyl-2-methylimidazole and 1-vinyl-2-phenylimidazole are preferred. Furthermore, suitable olefinically unsaturated heterocyclic compounds (g) are vinyl-heterocyclic compounds of the formulae (II) to (VIII), for example 2-vinylpyridine, 3-vinylpyridine, 4-vinylpyridine, 5-ethyl-2-vinylpyridine, 6-methyl-3-vinylpyridine, 2-vinylquinoline, 2-vinylisoquinoline, 4-vinylquinoline, 2-vinylquinoxaline, 4-vinylquinazoline, 2-vinylpyrimidine, 4-vinylpyrimidine and 2-vinylpyridazine as well as mixtures of these; 3-vinylpyridine and 4-vinylpyridine are preferred.

The copolymer (A) used according to the invention contains component (g) as copolymerized units in an amount of from 1 to 25, preferably from 2 to 20, % by weight.

(h) Examples of monomers which are not mentioned under (a) to (g) and whose copolymerized radicals are inert to isocyanate groups, ie. do not react with isocyanate or blocked isocyanate groups under the reaction conditions relevant to the novel process, are vinyl esters of carboxylic acids of 1 to 12 carbon atoms, such as vinyl acetate, vinyl propionate, vinyl pivalate, vinyl 2-ethylhexanate, vinyl laurate or vinyl benzoate, vinyl halides, eg. vinyl chloride, vinylidene halides, eg. vinylidene chloride, and N-vinylpyrrolidone and N-vinylcaprolactam, as well as mixtures of these.

The polyhydroxy polyacrylate resin can contain component (h) as copolymerized units in an amount of from 0 to 20, preferably from 0 to 10, % by weight.

The sum of the percentages stated under (a) to (h) is 100.

The hydroxyl-containing copolymer (A) generally has a hydroxyl number of from 30 to 250, preferably from 50 to 150.

The polyhydroxy polyacrylate resin (A) can be prepared from the monomers (a) to (h) by a conventional polymerization process, for example by continuous or batchwise free radical-initiated polymerization, preferably batchwise in organic solution at from 80° to 160°, for example in the presence of a polymerization initiator which provides free radicals. For the novel process, the polyhydroxy polyacrylate resins (A), which generally have mean molecular weights ($M_n$) of from 1,000 to 20,000 or Fikentscher K values of from 12 to 40, preferably from 15 to 30, are advantageously employed in solution in an organic solvent which is inert to isocyanate groups. Examples of suitable solvents of this type are esters, such as n-butyl acetate, ethyl acetate and isopropyl acetate, ethers, such as tetrahydrofuran, dioxane and diethylglycol, ether-esters, such as ethylglycol acetate, methylglycol acetate and butylglycol acetate, hydrocarbons, in particular aromatic hydrocarbons, such as xylene, toluene or ethylbenzene, and halohydrocarbons, such as chlorobenzene, as well as mixtures of these solvents.

(B) Suitable isocyanurate-containing polyisocyanates which are to be used according to the invention and have a functionality of from 2.5 to 6, preferably from 3 to 5, and in which none, some or all of the groups are blocked with CH-, NH- or OH-acidic blocking agents are those possessing predominantly cycloaliphatically bonded isocyanate groups. Preferred compounds are those isocyanurate-containing polyisocyanates which are obtained from 3-isocyanatomethyl-3,5,5-trimethylcyclohexyl isocyanate (=isophoron diisocyanate=IPDI) as the monomeric diisocyanate. Such polyisocyanates can be prepared, for example, by a conventional method, as described in, for example, British Pat. No. 1,391,066 or German Laid-Open Application DOS No. 2,325,826 and DOS No. 2,732,662, for example by trimerization of the diisocyanate at about 40°–120° C. in the presence of a catalyst, such as a metal compound, eg. a metal naphthenate, an alkaline earth metal acetate, formate or carbonate, a metal alkoxide or iron acetylacetonate, preferably a secondary or tertiary amine, such as an aziridine together with a trialkylamine or triethylenediamine, in combination with propylene oxide.

Isocyanurate-containing polyisocyanates based on 1,4-diisocyanatocyclohexane(=cyclohexane 1,4-diisocyanate) and 4,4'-diisocyanatodicyclohexylmethane(=dicyclohexylmethane 4,4'-diisocyanate) are also suitable.

Blocking agents which can be used for the surface coating polyisocyanates (B) are CH-, NH- or OH-acidic blocking agents, eg. dialkyl malonates, dialkyl acetoacetates, acetylacetone, ε-caprolactam, pyrrolidone, phenols, p-hydroxybenzoates, cyclohexanol or t-butanol, preferably oximes, such as benzophenone-oxime, cyclohexanone-oxime, methyl ethyl ketoxime or dimethyl ketoxime, particularly preferably monofunctional ketoximes, in particular methyl ethyl ketoxime and dimethyl ketoxime.

In component (B), the groups can be non-blocked or some or all of them can be blocked. Non-blocked polyisocyanates are preferred.

The proportions of the two binder components, polyisocyanate (B) and polyhydroxy polyacrylate (A), to be used according to the invention are advantageously chosen such that the ratio of the number of equivalents of blocked or non-blocked isocyanate groups to the number of equivalents of reactive hydroxyl groups is from 0.25:1 to 4:1, preferaby from 0.5:1 to 2:1.

Coatings are produced by the novel process by mixing components (A) and (B), advantageously in solution in an organic solvent or solvent mixture, with or without the addition of pigments, such as conventional white and black pigments, eg. titanium dioxides (rutile), zinc sulfides or carbon black, or colored pigments, eg. cadmium sulfide, iron oxide yellow, iron oxide red, chromium oxide, benzidine yellow, phthalocyanine blue, phthalo-cyanine green, thioindigo or quinacridones, for example in amounts of not more than 250%, based on the total amount of binder (component (A) and (B)), as well as other assistants and additives conventionally used for processing 2-component surface coatings, and applying the mixture onto the substrate to be coated. In principle, it is also possible to use a catalyst, such as a metal compound, eg. lead, zinc or cobalt naphthenate, lead, tin or calcium octoate, dibutyl-tin diacetate, dibutyl-tin dilaurate or iron acetylacetonate, and a base, such as triethylenediamine or diethylethanolamine, in amounts of about 0.001–10% by weight, based on the total amount of binder, but the coatings are preferably produced without the addition of a catalyst, since, as mentioned above, a surprising advantage of the novel surface coating mixtures is the fact that they harden very rapidly in the absence of an accelerator to give hard, scratch-resistant, gasoline-resistant layers but still have potlives which satisfy practical requirements.

Suitable methods of application are the conventional ones, for example spraying, dipping, brushing or roller-coating.

Using the novel process, it is possible, for example, to coat metal articles made of aluminum, zinc, tin, iron and steel, such as steel sheets, or galvanized steel sheets and aluminum sheets, as well as other substrates, such as wood, paper, concrete and plastics, eg. PVC and nylon.

After the substrate has been coated the coating can be hardened in a conventional manner, for example at room temperature in the course of from 24 hours to 7 days or, advantageously after drying it in the air at room temperature, at about 60°–80° C. in the course of from 20 to 60 minutes.

The process according to the invention gives coatings having particularly advantageous properties, in particular high scratch resistance, and excellent gasoline resistance after relatively short drying periods, coupled with high flexibility, good gloss, excellent weather resistance and rapid hardening. The corresponding surface coating mixtures have relatively long potlives.

In the Examples and Comparative Examples which follow, parts and percentages are by weight, unless stated otherwise.

PREPARATION OF THE POLYHYDROXY POLYACRYLATE RESINS

Examples 1 to 14

(polyhydroxy polyacrylate resins suitable according to the invention) and

Comparative Examples I to V and VII

The polyacrylate resins are prepared by a prior art method.

In a reaction vessel provided with a paddle stirrer, a reflux condenser, a receiver, a thermometer and a gas-inlet tube, 100 parts of a 1:1 mixture of n-butyl acetate and xylene are heated in each case to the temperature shown in Table 1 or 2. The solutions of the comonomer mixtures shown in Tables 1 and 2 and of the azodiisobutyronitrile used as a polymerization initiator, in 1:1 n-butyl acetate/xylene, are added dropwise at a constant rate in the absence of air (under a gentle stream of nitrogen) in the course of 4 hours, while stirring vigorously and maintaining the above temperature. Thereafter, a further 2.5 parts of a azodiisobutyronitrile in 75 parts of 1:1 n-butyl acetate/xylene are metered in steadily in the course of 2 hours to effect after-polymerization.

In contrast, in Comparative Examples I and II, samples of 100 parts of n-butyl acetate are initially taken, and a solution of 5 parts of azodiisobutyronitrile in 100 parts of n-butyl acetate is employed for after-polymerization.

Comparative Example VI

A mixture of 100 parts of ethylglycol acetate, 200 parts of xylene and 149 parts of glycidyl esters of $\alpha,\beta$-dialkylalkanemonocarboxylic acids of the empirical formula $C_{13}H_{24}O_3$ is heated to 135° C. in a reaction vessel as described above. Thereafter, a mixture of 101 parts of methyl methacrylate, 94 parts of hydroxyethyl methacrylate, 111 parts of styrene, 44 parts of acrylic acid, 1.5 parts of t-dodecylmercaptan and 5 parts of di-tert.-butyl peroxide is added dropwise in the course of 2 hours at a constant rate and at this temperature, and the resin solution is allowed to continue reacting for a further 6 hours at 135° C. The polymer solution, which has a solids content of 60%, is diluted with xylene to a solids content of 50%; it then has an efflux time of 250 sec. in DIN cup 4 at 23° C. Other parameters: OH number (based on solids): 150, acid number: 7, K value: 23.9.

TABLE 1

| Example | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Butane-1,4-diol monoacrylate | (parts) | 97.5 | 100 | 130 | 130 | 130 | | 65 | 65 | 65 | 130 | 130 | 130 | 130 | 38.5 |

TABLE 1-continued

| Example | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Hydroxyethyl acrylate | " | | | | | | 103 | 51.5 | 51.5 | | | | | | |
| 2-Hydroxypropyl acrylate | " | | | | | | | | | 58 | | | | | |
| Adduct of hydroxyethyl acrylate and ε-caprolactone (1:1)* | " | | | | | | | | | | | | | | 143.5 |
| Methyl methacrylate | " | 50 | | 50 | 50 | | 50 | 50 | | 50 | 50 | 50 | 50 | 50 | 75 |
| t-Butyl acrylate | " | 152.5 | 100 | 130 | 105 | 100 | 149.5 | 143.5 | 116 | 137 | 126 | 110 | 105 | 122.5 | 153 |
| n-Butyl acrylate | " | 175 | 250 | 165 | 165 | 220 | 172.5 | 165 | 217.5 | 165 | 165 | 165 | 165 | 142.5 | 65 |
| 1-Vinylimidazole | " | 25 | 50 | 25 | 50 | 50 | 25 | 25 | 50 | 25 | | | | 25 | 25 |
| 1-Vinyl-2-methylimidazole | " | | | | | | | | | | 29 | | | | |
| 1-Vinyl-2-phenylimidazole | " | | | | | | | | | | | 45 | | | |
| 4-Vinylpyridine | " | | | | | | | | | | | | 50 | | |
| Azodiisobutyronitrile | " | 10 | 10 | 10 | 10 | 10 | 10 | 10 | 10 | 10 | 10 | 10 | 10 | 10 | 10 |
| n-Butyl acetate | " | 62.5 | 62.5 | 62.5 | 62.5 | 62.5 | 62.5 | 62.5 | 62.5 | 62.5 | 62.5 | 62.5 | 62.5 | 62.5 | 62.5 |
| Xylene | " | 62.5 | 62.5 | 62.5 | 62.5 | 62.5 | 62.5 | 62.5 | 62.5 | 62.5 | 62.5 | 62.5 | 62.5 | 62.5 | 62.5 |
| Polymerization temperature (°C.) | | 100 | 100 | 100 | 100 | 90–95 | 100 | 100 | 100 | 100 | 100 | 100 | 100 | 100 | 100 |
| OH number (mg of KOH/g of solids) | | 75 | 80 | 100 | 100 | 100 | 100 | 100 | 100 | 100 | 100 | 100 | 100 | 125 | 100 |
| Viscosity at 23° C. (mPa · s) | | 1900 | 1700 | 2050 | 3800 | 5500 | 3650 | 2600 | 2200 | 2350 | 2350 | 2400 | 4500 | 2700 | 3900 |
| K value (3% strength solution in dimethylformamide) | | 21.6 | 19.5 | 20.3 | 22.2 | 23.1 | 22.3 | 21.3 | 20.7 | 21.1 | 21.2 | 21.4 | 23.0 | 21.7 | 22.9 |

*prepared from 50.4 parts of hydroxyethyl acrylate and 49.6 parts of ε-caprolactone

TABLE 2

| | | Comparative Example | | | | | |
|---|---|---|---|---|---|---|---|
| | | I for Examples 3 + 4 | II for Examples 3 + 4 | III for Examples 3,4 + 6 | IV for Examples 3,4 + 6 | V for Example 2 | VII for Example 14 |
| Hydroxyethyl acrylate | (parts) | 103 | | 103 | 103 | 83 | 31 |
| Hydroxyethyl methacrylate | (parts) | | 117.5 | | | | |
| Adduct of hydroxyethyl acrylate and ε-caprolactone (1:1) | (parts) | | | | | | 143.5 |
| Methyl methacrylate | (parts) | 50 | 50 | 50 | 50 | | 100 |
| t-Butyl acrylate | (parts) | 152 | 152.5 | 149.5 | 144.5 | 117 | 153 |
| n-Butyl acrylate | (parts) | 192.5 | 177.5 | 172.5 | 172.5 | 250 | 72.5 |
| Acrylonitrile | (parts) | | | 25 | | | |
| N—Vinylpyrrolidone | (parts) | | | | 30 | | |
| Dimethylaminoethyl methacrylate | (parts) | | | | | 50 | |
| Acrylic acid | (parts) | 2.5 | 2.5 | | | | |
| Azodiisobutyronitrile | (parts) | 10 | 10 | 10 | 10 | 10 | 10 |
| n-Butyl acetate | (parts) | 133 | 133 | 62.5 | 62.5 | 62.5 | 62.5 |
| Xylene | (parts) | | | 62.5 | 62.5 | 62.5 | 62.5 |
| Polymerization temperature (°C.) | | 100 | 110 | 100 | 100 | 90 | 100 |
| OH number (mg of KOH/g of solids) | | 100 | 100 | 100 | 100 | 80 | 100 |
| Viscosity at 23° C. (mPa · s) | | 3400 | 3000 | 1850 | 1750 | 1300 | 3500 |
| K value (3% strength in dimethylformamide) | | 23.2 | 21.1 | 20.8 | 19.7 | 20.1 | 22.7 |

1. TESTING NON-PIGMENTED TWO-COMPONENT REACTIVE SURFACE COATINGS

The polyacrylate resins described in Examples 1 to 14 and Comparative Examples I to VII are combined with an isocyanurate-containing polyisocyanate based on isophoron diisocyanate (IPDI).

To do this, portions of 500 parts of the copolymer solution having a solids content of from 62 to 63% for Examples 1 to 14 and Comparative Examples I to V and VII, of about 60% for Comparative Examples I and II and of about 50% for Comparative Example VI are thoroughly mixed with the stoichiometric amount (OH/NCO=1:1, cf. Table 3) of a 70% strength solution of the polyisocyanate in a 1:1 mixture of ethylglycol acetate and xylene (NCO content about 12%), and the mixture is then diluted with n-butyl acetate to spray viscosity (efflux time 20 sec. in DIN cup 4 at 23° C.). In each of Comparative Examples I, II, III, IV, VI and VII, an additional formulation is prepared with the addition of a catalyst (30 parts of a 1% strength solution of dibutyl-tin dilaurate in n-butyl acetate, corresponding to 0.07% solids/solids, and 46 parts of a 4% strength solution of calcium octoate in n-butyl acetate, corresponding to 0.43% solids/solids). The mixtures are then sprayed onto steel sheets to give a layer which is from 40 to 50 μm thick when dry. The surface coating layers are hardend either for 1 day and 7 days at room temperature, or are dried in the air at room temperature for 30 minutes and then hardened in a through-circulation oven both for 30 minutes and for 60 minutes at 80° C. The König pendulum hardness, the scratch resistance and the Erichsen deep-drawing values are determined for each of the layers hardened for 7 days at room temperature and for 60 minutes at 80° C., the König pendulum hardness is determined for each of the layers hardened for 1 day at room temperature, and the pendulum hardness and the Erichsen deep-drawing value are determined for each of the layers hardened for 30 minutes at 80° C. The results of the tests are summarized in Table 3.

addition of a catalyst mixture (30 parts of a 1% strength solution of dibutyl-tin dilaurate, corresponding to 0.07% of solids based on the binder, and 46 parts of a

TABLE 3

| Example/ Comparative Example no. | Amount of poly-isocyanate 70% strength (parts) | Catalyzed yes/no | Properties of the clear surface coating films ||||||||||
|---|---|---|---|---|---|---|---|---|---|---|---|
| | | | Hardening at room temperature |||| Hardening at 80° C. |||||
| | | | 1 day | 7 days ||| 30 min ||| 60 min |||
| | | | PH (sec) | PH (sec) | SR | ED (mm) | PH (sec) | SF | ED (mm) | PH (sec) | SR | ED (mm) |
| 1 | 146 | no | 106 | 160 | 1 | 8.1 | 145 | 1–2 | 9.1 | 180 | 1 | 7.2 |
| 2 | 156 | no | 110 | 155 | 0 | 9.1 | 160 | 0 | 9.7 | 170 | 0 | 9.4 |
| 3 | 195 | no | 130 | 165 | 0 | 9.2 | 183 | 0 | 8.6 | 189 | 0 | 8.3 |
| 4 | 195 | no | 132 | 175 | 0 | 7.7 | 185 | 0 | 7.3 | 193 | 0 | 7.1 |
| 5 | 195 | no | 130 | 167 | 0 | 8.9 | 178 | 0 | 7.6 | 185 | 0 | 7.4 |
| 6 | 195 | no | 108 | 170 | 1 | 9.0 | 185 | 1 | 5.3 | 195 | 0–1 | 7.9 |
| 7 | 195 | no | 122 | 168 | 0 | 8.7 | 188 | 0 | 8.1 | 200 | 0 | 7.8 |
| 8 | 195 | no | 120 | 160 | 0 | 7.5 | 170 | 0 | 7.8 | 175 | 0 | 8.0 |
| 9 | 195 | no | 115 | 158 | 0 | 8.1 | 190 | 0 | 7.5 | 195 | 0 | 7.0 |
| 10 | 195 | no | 120 | 180 | 0 | 8.0 | 190 | 0 | 7.5 | 195 | 0 | 7.0 |
| 11 | 195 | no | 110 | 175 | 0–1 | 7.3 | 190 | 0 | 7.0 | 200 | 0 | 7.6 |
| 12 | 195 | no | 90 | 150 | 0–1 | 8.3 | 176 | 1 | 7.8 | 195 | 0 | 6.8 |
| 13 | 244 | no | 100 | 155 | 0–1 | 7.5 | 150 | 0–1 | 7.0 | 160 | 0 | 6.5 |
| 14 | 195 | no | 105 | 170 | 0–1 | 9.8 | 200 | 0 | 10.0 | 205 | 0 | 9.0 |
| I | 188 | no | 53 | 165 | 3 | 1.1 | 173 | 3 | <1 | 188 | 2 | 1.4 |
| I a | 188 | yes | 95 | 160 | 2 | 9.0 | 170 | 2 | 8.8 | 175 | 1 | 7.9 |
| II | 188 | no | 88 | 175 | 1 | <1 | 189 | 1 | <1 | 189 | 1 | 6.5 |
| II a | 188 | yes | 116 | 162 | 1 | 8.0 | 167 | 1 | 6.5 | 174 | 2 | 7.5 |
| III | 195 | no | 80 | 170 | 0 | <1 | 180 | 0–1 | <1 | 182 | 0 | 1.5 |
| III a | 195 | yes | 110 | 165 | 0 | 7.0 | 168 | 0–1 | 6.5 | 175 | 0 | 6.3 |
| V | 195 | no | 72 | 155 | 0–1 | <1 | 161 | 1 | <1 | 165 | 0–1 | 2.2 |
| V a | 195 | yes | 100 | 162 | 0 | 7.2 | 153 | 0–1 | 6.0 | 167 | 0 | 5.8 |
| VI | 235 | no | 105 | 192 | 1 | <1 | 195 | 1 | <1 | 209 | 1 | <1 |
| VI a | 235 | yes | 135 | 190 | 1 | <1 | 200 | 1 | <1 | 203 | 1 | <1 |
| VII | 195 | no | 60 | 155 | 3 | 1.5 | 135 | 3–4 | 5.0 | 170 | 3 | 6.0 |
| VII a | 195 | yes | 102 | 160 | 2 | 5.3 | 158 | 2–3 | 6.5 | 177 | 1 | 4.8 |

PH: König pendulum hardness (sec) according to DIN 53,157
SR: Scratch resistance, rating 0–5 according to DIN 53,230
ED: Erichsen deep-drawing value (mm) according to DIN 53,156

As can be seen from Table 3, the clear surface coating films produced according to the invention without the use of a catalyst exhibit rapid hardening and good final hardness, scratch resistance and flexibility both when dried at room temperature and when drying is accelerated. The corresponding films obtained from prior art polyacrylate resins and the above isocyanurate-containing polyisocyanate possess, as shown in the Comparative Examples, a much less advantageous spectrum of properties than the novel coatings, even where large amounts of catalyst are used.

2. TESTING THE PIGMENTED TWO-COMPONENT REACTIVE SURFACE COATINGS (corresponding to Examples 1 to 14 and Comparative Examples I to VII)

Portions of 500 parts of the copolymer solution having a solids content of from 62 to 63% for Examples 1 to 14 and Comparative Examples III to V and VII, of about 60% for Comparative Examples I and II and of about 50% for Comparative Example VI are milled with 440 parts of titanium dioxide (rutile) and 150 parts of a 4:4:2 solvent mixture of n-butyl acetate, xylene and ethylglycol acetate to give a surface coating. The stoichiometric amount (shown in Table 4, column 2) of a 70% strength polyisocyanate solution in ethylglycol acetate/xylene (1:1, NCO content about 12%) is added to each of the pigmented surface coating mixtures, and the resulting surface coatings are diluted with the above solvent mixture to spray viscosity (efflux time 20 sec. in DIN cup 4 at 23° C.). In the Comparative Examples, an additional formulation is prepared in each case, with the 4% strength solution of calcium octoate in n-butyl acetate, corresponding to 0.43% of solids based on the binder). The surface coatings are then sprayed onto steel sheets to give a layer which is about 50 μm thick when dry. The coated sheets are dried in the air for 30 minutes at room temperature and then for 60 minutes at 80° C. in a through-circulation oven, and are also dried for 7 days at room temperature. In each case, the König pendulum hardness according to DIN 53 157, the scratch resistance according to DIN 53 230, the Erichsen deep-drawing value according to DIN 53 156 and the gasoline resistance of the hardened surface coating films are tested (in each case after drying for 60 minutes at 80° C. and after drying for 4 days at room temperature), and the potlife of the ready-prepared surface coating mixtures is also determined. The potlife is the time up to the point when a solution brought to spray viscosity gels at 23° C.

To test the gasoline resistance, a ball of cottonwool impregnated with gasoline is allowed to act on the hardened surface coating film for 5 minutes, the cottonwool being covered with a glass dish during this period. The cottonwool ball is removed and air-drying is carried out for 35 minutes, after which the film is rated from 0 to 5 in accordance with DIN 53 230.

The results of the tests are summarized in Table 4. The pigmented surface coatings of Examples 1 to 14 and of Comparative Examples I to VII give highly glossy smooth layers. Table 4 clearly shows that the novel catalyst-free surface coating mixtures harden very rapidly to give hard, scratch-resistant films with high flexibility and excellent gasoline resistance, and at the same time possess potlives which satisfy processing requirements. In contrast, Comparative Examples I to IV and VI, in the absence of a catalyst, likewise give hard coatings which in some cases are scratch-resistant, these coatings are much too brittle and have a substantially lower gasoline resistance. Comparative Examples V and VII lead to very soft surface coating films having low scratch resistance. Although the addition of large amounts of catalyst leads in some cases to substantially more flexible layers having the same hardness and good scratch resistance, both the flexibility and the gasoline resistance of the films are still substantially inferior to those of the novel coatings. Moreover, the catalyzed surface coating mixtures have substantially shorter potlives than the novel catalyst-free formulations.

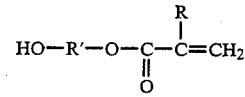

where R is hydrogen or methyl, R' is straight-chain or branched alkylene of 2 to 18 carbon atoms or an alkylene radical of 7 to 17 carbon atoms which contains not more than three cycloaliphatic groups, and, if appropriate, some or all of the groups HO—R'— can be replaced by the group Z—O—R'—, where Z is a radical of the formula

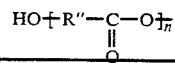

TABLE 4

| Example Comparative Example no. | Amount of polyisocyanate 70% strength (parts) | Catalyzed yes/no | Pot life* (h) | Properties of the white surface coating films | | | | | | | |
|---|---|---|---|---|---|---|---|---|---|---|---|
| | | | | Hardening for 60 min at 80° C. | | | | Hardening at room temperature | | | BR (after 4 days) |
| | | | | | | | | 7 days | | | |
| | | | | PH (sec) | SR | ED (mm) | GR | PH (sec) | SR | ED (mm) | |
| 1 | 146 | no | 28 | 143 | 1 | 6.5 | 0 | 100 | 1 | 9.6 | 0 |
| 2 | 156 | no | 22 | 133 | 0 | 8.3 | 0 | 105 | 0–1 | 8.5 | 0 |
| 3 | 195 | no | 25 | 150 | 0 | 8.0 | 0 | 135 | 0 | 7.0 | 0 |
| 4 | 195 | no | 21 | 155 | 0 | 6.4 | 0–1 | 130 | 0 | 7.2 | 0–1 |
| 5 | 195 | no | 22 | 140 | 0 | 7.5 | 0–1 | 125 | 0 | 7.0 | 0 |
| 6 | 195 | no | 30 | 150 | 1 | 5.5 | 0 | 120 | 1 | 8.7 | 0 |
| 7 | 195 | no | 23 | 148 | 0 | 7.0 | 0–1 | 130 | 0 | 7.5 | 0 |
| 8 | 195 | no | 22 | 143 | 0 | 7.8 | 0 | 128 | 0 | 7.5 | 0 |
| 9 | 195 | no | 30 | 145 | 0–1 | 7.5 | 0–1 | 132 | 0 | 6.8 | 0–1 |
| 10 | 195 | no | 24 | 152 | 0 | 6.0 | 0 | 125 | 0–1 | 8.6 | 0 |
| 11 | 195 | no | 25 | 160 | 0 | 5.9 | 0 | 118 | 0–1 | 8.5 | 0 |
| 12 | 195 | no | 35 | 140 | 0 | 8.4 | 1 | 120 | 0 | 7.5 | 0–1 |
| 13 | 244 | no | 21 | 162 | 0 | 6.8 | 1 | 115 | 0–1 | 8.6 | 1 |
| 14 | 195 | no | 25 | 155 | 0 | 8.2 | 0–1 | 135 | 0 | 9.0 | 0 |
| I | 188 | no | 47 | 128 | 2 | <1 | 2–3 | 116 | 2 | 3.5 | 3 |
| I a | 188 | yes | 12 | 145 | 1 | 4.2 | 2 | 130 | 1–2 | 4.9 | 2–3 |
| II | 188 | no | 45 | 139 | 1 | <1 | 1–2 | 135 | 1 | <1 | 2 |
| II a | 188 | yes | 10 | 140 | 1 | <1 | 1 | 133 | 1 | <1 | 1–2 |
| III | 195 | no | 43 | 135 | 2 | 1.0 | 3–4 | 120 | 2 | 2.5 | 3 |
| III a | 195 | yes | 13 | 140 | 0–1 | 2.5 | 2–3 | 130 | 1 | 4.0 | 2 |
| IV | 195 | no | 50 | 130 | 1–2 | 1.2 | 3 | 125 | 2 | 2.8 | 2–3 |
| IV a | 195 | yes | 14 | 136 | 1 | 3.0 | 2 | 120 | 1 | 4.5 | 2 |
| V | 195 | no | 25 | 100 | 2–3 | 8.0 | 3 | 90 | 3 | 9.0 | 2 |
| VI | 235 | no | 55 | 170 | 1 | <1 | 1 | 150 | 1 | <1 | 2–3 |
| VI a | 235 | yes | 18 | 180 | 0–1 | <1 | 0–1 | 155 | 0 | <1 | 2 |
| VII | 195 | no | 80 | 110 | 2–3 | 10.5 | 4 | 105 | 2–3 | 10.0 | 4 |
| VII a | 195 | yes | 17 | 132 | 1–2 | 5.2 | 2–3 | 135 | 1 | 6.0 | 3 |

PH: Konig pendulum hardness (sec) according to DIN 53,157
SR: Scratch resistance. rating 0–5 according to DIN 53,230
ED: Erichsen deep-drawing value (mm) according to DIN 53,156
GR: gasoline-resistant
*time in hours up to the point when the surface coating mixture brought to spray viscosity gels

We claim:
1. A process for the production of a coating which comprises: reacting
(A) a polyhydroxy polyacrylate resin comprising esters of acrylic acid or methacrylic acid with monofunctional aliphatic alcohols, monoesters of acrylic acid or methacrylic acid with polyfunctional aliphatic alcohols and other copolymerizable olefinically unsaturated monomers with
(B) isocyanurate-containing polyisocyanates which have a functionality of from 2.5 to 6 and which may be partially or completely blocked with CH—, NH— or OH—acidic blocking agents,
wherein the polyhydroxy polyacrylate resin (A) used is a hydroxyl-containing copolymer comprising
(a) from 6 to 70% by weight of one or more esters of the formula where n is an integer from 1 to 3 and R" is an alkylene chain of 4 to 8 carbon atoms which may additionally contain from 1 to 3 alkyl substituents having in total not more than 10 carbon atoms or a cycloaliphatic radical of 6 to 10 carbon atoms or an unsubstituted or alkyl-substituted aromatic radical of 6 to 8 carbon atoms or an araliphatic radical of 7 to 9 carbon atoms or an alkoxy radical of 1 to 8 carbon atoms,
(b) from 0 to 40% by weight or from 0 to 50% by weight, respectively, of one or more hydroxyalkyl esters of acrylic acid or methacrylic acid of the formula

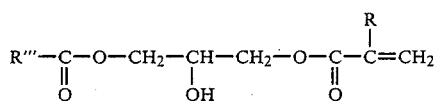

where R is hydrogen or methyl and R'' is an alkyl radical of a branched aliphatic carboxylic acid of 4 to 26 carbon atoms, (c) from 10 to 50% by weight of one or more alkyl acrylates or methacrylates which form homopolymers having glass transition temperatures of from +5° C. to +120° C., (d) from 0 to 10% by weight of a vinyl-aromatic, (e) from 10 to 60% by weight of one or more alkyl esters, or alkylglycol esters containing not more than 2 etheroxygen bridges, of acrylic acid or methacrylic acid, which esters form homopolymers having glass transition temperatures of from −80° C. to +4.5° C., (f) from 0 to 10% by weight of an acrylamide or methacrylamide which may or may not be substituted at the amide nitrogen by one or two alkyl radicals of 1 to 8 carbon atoms, which may contain a carbonyl group, or by one or two phenyl radicals, (g) from 1 to 25% by weight of one or more polymerizable, olefinically unsaturated, heterocyclic compounds of the formulae (I) to (VIII)

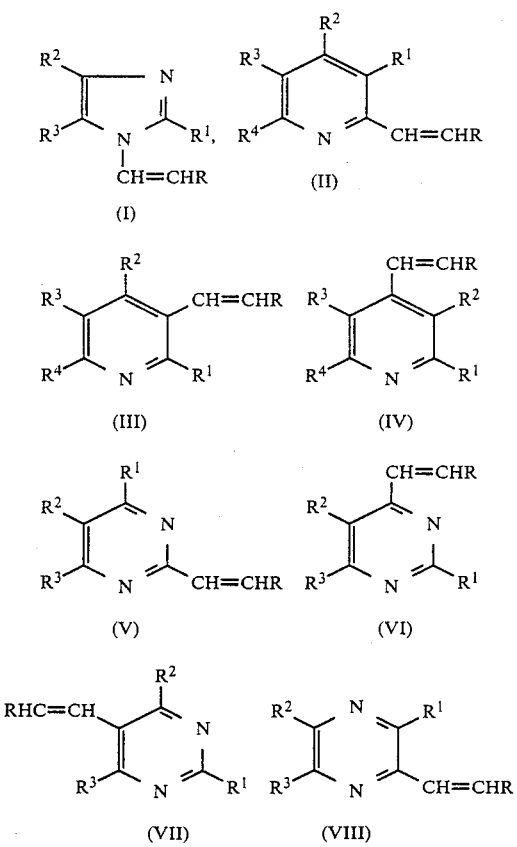

where R is hydrogen or methyl and $R^1$, $R^2$, $R^3$ and $R^4$ are identical or different and are each hydrogen, methyl, ethyl, straight-chain or branched alkyl of 3 or 4 carbon atoms, phenyl which is unsubstituted or substituted by alkyl of 1 to 4 carbon atoms, halogen or nitro, a group of the formula $-R^I-A-R^{II}$, where A is oxygen or sulfur, $R^I$ is methylene or ethylene or is phenylene which is unsubstituted or substituted by alkyl of 1 to 4 carbon atoms, halogen or nitro, and $R^{II}$ is methyl or ethyl or is phenyl which is unsubstituted or substituted by alkyl of 1 to 4 carbon atoms, halogen or nitro, or $R^1$, $R^2$, $R^3$ and $R^4$ are each halogen, nitro or a group of the formula $-OR^{III}$, $-COOR^{III}$, $-SO_2R^{III}$, $-CONR^{III}R^{IV}$ or $-SO_2NR^{III}R^{IV}$, where $R^{III}$ and $R^{IV}$ are identical or different and are each methyl, ethyl, a straight-chain or branched alkyl radical of 3 or 4 carbon atoms or phenyl which is unsubstituted or substituted by alkyl of 1 to 4 carbon atoms, halogen or nitro, and furthermore, $R^2$ and $R^3$ in formulae (I), (II), (III), (V), (VI) and (VIII) or $R^3$ and $R^4$ in formula (III), and either $R^3$ and $R^4$ or $R^1$ and $R^2$ or $R^3$ and $R^4$ as well as $R^1$ and $R^2$ in formulae (II) and (IV), together with the heterocyclic structure, can form a fused six-membered aromatic ring which is unsubstituted or substituted by alkyl of 1 to 4 carbon atoms, halogen or nitro, and (h) from 0 to 20% by weight of monomers which are not mentioned under (a) to (g) and whose copolymerized radicals are inert to isocyanate groups, with the proviso that the sum of the percentages stated under (a) and (b) is from 6 to 70, the sum of the percentages stated under (c), (d) and (g) is from 11 to 60 and the sum of the percentages of the components stated under (a) to (h) is 100, and the isocyanurate-containing polyisocyanate (B) with a functionality of from 2.5 to 6 is one which predominantly contains cycloaliphatically bonded isocyanate groups.

2. A process as claimed in claim 1, wherein the hydroxyl-containing copolymer (A) contains component (b) as copolymerized units in an amount of from 0 to 50% by weight.

3. A process as claimed in claim 1, wherein the cycloaliphatic isocyanurate-containing polyisocyanate (B) used is a product obtained from 3-isocyanatomethyl-3,5,5-trimethylcyclohexyl isocyanate as the monomeric diisocyanate.

4. A process as claimed in claim 1, wherein the hydroxyl number of the hydroxyl-containing copolymer (A) is from 30 to 250.

5. A process as claimed in claim 1, wherein the hydroxyl number of the hydroxyl-containing copolymer (A) is from 50 to 150.

6. A process as claimed in claim 1, wherein hydroxyethyl acrylate or methacrylate is used as component (a) of the hydroxyl-containing copolymer.

7. A process as claimed in claim 1, wherein butane-1,4-diol monoacrylate, hexane-1,6-diol monoacrylate, butane-1,4-diol monomethacrylate or hexane-1,6-diol monomethacrylate is used as component (a) of the hydroxyl-containing copolymer.

8. A process as claimed in claim 1, wherein a reaction product of hydroxyethyl acrylate or methacrylate or 2-hydroxypropyl acrylate or methacrylate or butane-1,4-diol monoacrylate, hexane-1,6-diol monoacrylate, butane-1,4-diol monomethacrylate or hexane-1,6-diol monomethacrylate with ε-caprolactone which is unsubstituted or substituted by 1, 2 or 3 alkyl radicals having in total not more than 10 carbon atoms, in a molar ratio of 1.5:1 to 1:3, is used as component (a) of the hydroxyl-containing copolymer.

9. A process as claimed in claim 8, wherein a reaction product of hydroxyethyl acrylate or methacrylate or 2-hydroxypropyl acrylate or methacrylate or butane- 1,4-diol monoacrylate or methacrylate with ε-caprolactone in a molar ratio of from 1.5:1 to 1:3 is used as component (a) of the hydroxyl-containing copolymer.

10. A process as claimed in claim 1, wherein a mixture comprising from 1 to 99% by weight of a reaction product mentioned in claim 9 with from 99 to 1% by weight of hydroxyethyl acrylate or methacrylate or butane-1,4-diol monoacrylate or methacrylate is used as component (a) of the hydroxyl-containing copolymer.

11. A process as claimed in claim 1, wherein one or more N-vinylimidazoles of the formula (Ia)

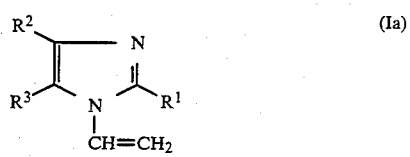

where $R^1$, $R^2$ and $R^3$ are each hydrogen, methyl, ethyl, a straight-chain or branched alkyl radical of 3 or 4 carbon atoms or phenyl which is unsubstituted or substituted by alkyl of 1 to 4 carbon atoms, halogen or nitro, and furthermore $R^2$ and $R^3$, together with the heterocyclic structure, can form a fused six-membered aromatic ring which is unsubstituted or substituted by alkyl of 1 to 4 carbon atoms, halogen or nitro, are used as component (g) of the hydroxyl-containing copolymer.

12. A process as claimed in claim 11, wherein from 2 to 20% by weight of component (g) is employed for the hydroxyl-containing copolymer.

13. A process as claimed in claim 1, wherein one or more vinyl compounds of the formula

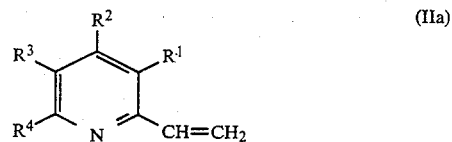

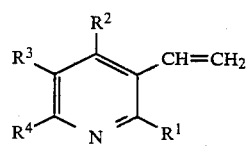

or

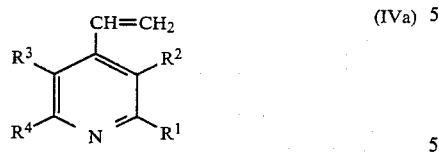

where $R^1$, $R^2$, $R^3$ and $R^4$ have the same meanings as $R^1$, $R^2$ and $R^3$ in formula (Ia) of claim 11, and furthermore $R^3$ and $R^4$ or $R^2$ and $R^3$ in formulae (IIa) and (IIIa) or both $R^1$ and $R^2$ and $R^3$ and $R^4$ in formula (IVa), together with the heterocyclic structure, can form a fused six-membered aromatic ring which is unsubstituted or substituted by alkyl of 1 to 4 carbon atoms, halogen or nitro, are used as component (g) of the hydroxyl-containing copolymer.

14. A process as claimed in claim 13, wherein 4-vinylpyridine is used as component (g) of the hydroxyl-containing copolymer.

15. A process as claimed in claim 13, wherein from 2 to 20% by weight of component (g) is employed for the hydroxyl-containing copolymer.

16. A process as claimed in claim 1, wherein the proportions of components (A) and (B) are chosen such that the ratio of the number of equivalents of isocyanate groups which may be partially or completely blocked with CH—, NH— or OH—acidic blocking agents to the number of equivalents of reactive hydroxyl groups is from 0.25:1 to 4:1.

17. A process as claimed in claim 1, wherein a monofunctional ketoxime is used as a blocking agent for the polyisocyanate in which none, some or all of the groups are blocked.

18. A process as claimed in claim 1, wherein dimethyl ketoxime or methyl ethyl ketoxime is used as a blocking agent for the polyisocyanate.

19. A coating composition which comprises:
(A) a polyhydroxy polyacrylate resin comprising esters of acrylic acid or methacrylic acid with monofunctional aliphatic alcohols, monoesters of acrylic acid or methacrylic acid with polyfunctional aliphatic alcohols and other copolymerizable olefinically unsaturated monomers and
(B) isocyanurate-containing polyisocyanates which have a functionality of from 2.5 to 6 and which may be partially or completely blocked with CH—, NH— or OH—acidic blocking agents, wherein the polyhydroxy polyacrylate resin (A) used is a hydroxyl-containing copolymer comprising
(a) from 6 to 70% by weight of one or more esters of the formula

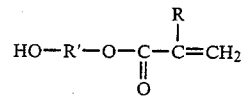

where R is hydrogen or methyl, R' is straight-chain or branched alkylene of 2 to 18 carbon atoms or an alkylene radical of 7 to 17 carbon atoms which contains not more than three cycloaliphatic groups, and, if appropriate, some or all of the groups HO—R'— can be replaced by the group Z—O—R'—, where Z is a radical of the formula

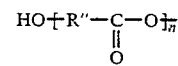

where n is an integer from 1 to 3 and R" is an alkylene chain of 4 to 8 carbon atoms which may additionally contain from 1 to 3 alkyl substituents having in total not more than 10 carbon atoms or a cycloaliphatic radical of 6 to 10 carbon atoms or an unsubstituted or alkyl-substituted aromatic radical of 6 to 8 carbon atoms or an araliphatic radical of 7 to 9 carbon atoms or an alkoxy radical of 1 to 8 carbon atoms,
(b) from 0 to 40% by weight or from 0 to 50% by weight, respectively, of one or more hydroxyalkyl esters of acrylic acid or methacrylic acid of the formula

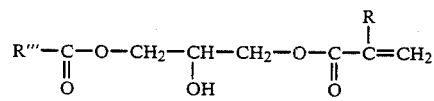

where R is hydrogen or methyl and R″ is an alkyl radical of a branched aliphatic carboxylic acid of 4 to 26 carbon atoms,
  (c) from 10 to 50% by weight of one or more alkyl acrylates or methacrylates which form homopolymers having glass transition temperatures of from +5° C. to +120° C.,
  (d) from 0 to 10% by weight of a vinyl-aromatic,
  (e) from 10 to 60% by weight of one or more alkyl esters, or alkylglycol esters containing not more than 2 ether-oxygen bridges, of acrylic acid or methacrylic acid, which esters form homopolymers having glass transition temperatures of from −80° C. to +4.5° C.,
  (f) from 0 to 10% by weight of an acrylamide or methacrylamide which may or may not be substituted at the amide nitrogen by one or two alkyl radicals of 1 to 8 carbon atoms, which may contain a carbonyl group, or by one or two phenyl radicals,
  (g) from 1 to 25% by weight of one or more polymerizable, olefinically unsaturated, heterocyclic compounds of the formulae (I) to (VIII)

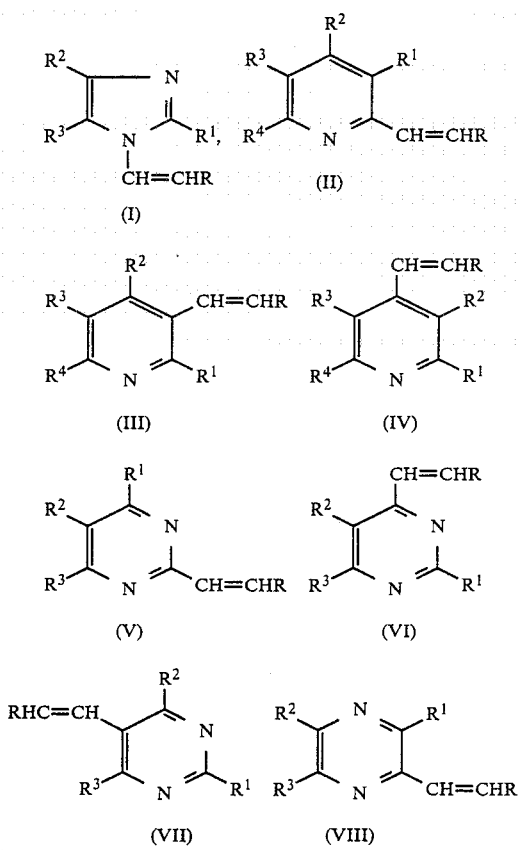

where R is hydrogen or methyl and $R^1$, $R^2$, $R^3$ and $R^4$ are identical or different and are each hydrogen, methyl, ethyl, straight-chain or branched alkyl of 3 or 4 carbon atoms, phenyl which is unsubstituted or substituted by alkyl of 1 to 4 carbon atoms, halogen or nitro, a group of the formula —$R^1$—A—$R^1$—, *where A is oxygen or sulfur*, $R^1$ is methylene or ethylene or is phenylene which is unsubstituted or substituted by alkyl of 1 to 4 carbon atoms, halogen or nitro, and $p^{II}$ is methyl or ethyl or is phenyl which is unsubstituted or substituted by alkyl of 1 to 4 carbon atoms, halogen or nitro, or $R^1$, $R^2$, $R^3$ and $R^4$ are each halogen, nitro or a group of the formula —$OR^{III}$, —$COOR^{III}$, —$SO_2R^{III}$, —$CONR^{III}R^{IV}$ or —$SO_2NR^{III}R^{IV}$, where $R^{III}$ and $R^{IV}$ are identical or different and are each methyl, ethyl, a straight-chain or branched alkyl radical of 3 or 4 carbon atoms or phenyl which is unsubstituted or substituted by alkyl of 1 to 4 carbon atoms, halogen or nitro, and furthermore, $R^2$ and $R^3$ in formulae (I), (II), (III), (V), (VI) and (VIII) or $R^3$ and $R^4$ in formula (III), and either $R^3$ and $R^4$ or $R^1$ and $R^2$ or $R^3$ and $R^4$ as well as $R^1$ and $R^2$ in formulae (II) and (IV), together with the heterocyclic structure, can form a fuses six-membered aromatic ring which is unsubstituted or substituted by alkyl of 1 to 4 carbon atoms, halogen or nitro, and
  (h) from 0 to 20% by weight of monomers which are not mentioned under (a) to (g) and whose copolymerized radicals are inert to isocyanate groups, with the proviso that the sum of the percentages stated under (a) and (b) is from 6 to 70, the sum of the percentages stated under (c), (d) and (g) is from 10 to 60 and the sum of the percentages of the components stated under (a) to (h) is 10D,
and the isocyanurate-containing polyisocyanate (B) with a functionality of from 2.5 to 6 is one which predominantly contains cycloaliphatically bonded isocyanate groups.

20. The coating composition of claim 19, wherein the hydroxyl-containing copolymer (A) contains component (b) as copolymerized units in an amount of from 0 to 50% by weight.

21. The coating composition of claim 19, wherein the cycloaliphatic isocyanurate-containing polyisocyanate (B) used is a product obtained from 3-isocyanatomethyl-3,5,5-trimethylcyclohexyl isocyanate as the monomeric diisocyanate.

22. The coating composition of claim 19, wherein the hydroxyl number of the hydroxyl-containing copolymer (A) is from 30 to 250.

23. The coating composition of claim 19, wherein the hydroxyl number of the hydroxyl-containing copolymer (A) is from 50 to 150.

24. The coating composition of claim 19, wherein hydroxyethyl acrylate or methacrylate is used as component (a) of the hydroxyl-containing copolymer.

25. The coating composition of claim 19 wherein butane-1,4-diol monoacrylate, hexane-1,6-diol monoacrylate, butane-1,4-diol monomethacrylate or hexane-1,6-diol monomethacrylate is used as component (a) of the hydroxyl-containing copolymer.

26. The coating composition of claim 19, wherein a reaction product of hydroxyethyl acrylate or methacrylate or 2-hydroxypropyl acrylate or methacrylate or butane-1,4-diol monoacrylate, hexane-1,6-diol monoacrylate, butane-1,4-diol monomethacrylate or hexane-1,6-diol monomethacrylate with ε-caprolactone which is unsubstituted or substituted by 1, 2 or 3 alkyl radicals having in total not more than 10 carbon atoms, in a molar ratio of 1.5:1 to 1:3, is used as component (a) of the hydroxyl-containing copolymer.

27. The coating composition of claim 26, wherein a reaction product of hydroxyethyl acrylate or methacrylate or 2-hydroxypropyl acrylate or methacrylate or butane-1,4-diol monoacrylate or methacrylate with ε-caprolactone in a molar ratio of from 1.5:1 to 1:3 is used as component (a) of the hydroxyl-containing copolymer.

28. The coating composition of claim 19, wherein a mixture comprising from 1 to 99% by weight of a reaction product mentioned in claim 9 with from 99 to 1% by weight of hydroxyethyl acrylate or methacrylate or butane-1,4-diol monoacrylate or methacrylate is used as component (a) of the hydroxyl-containing copolymer.

29. The coating composition of claim 19, wherein one or more N-vinylimidazoles of the formula (Ia)

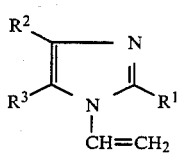 (Ia)

where $R^1$, $R^2$ and $R^3$ are each hydrogen, methyl, ethyl, a straight-chain or branched alkyl radical of 3 or 4 carbon atoms or phenyl which is unsubstituted or substituted by alkyl of 1 to 4 carbon atoms, halogen or nitro, and furthermore $R^2$ and $R^3$, together with the heterocyclic structure, can form a fused six-membered aromatic ring which is unsubstituted or substituted by alkyl of 1 to 4 carbon atoms, halogen or nitro, are used as component (g) of the hydroxyl-containing copolymer.

30. The coating composition of claim 29, wherein from 2 to 20% by weight of component (g) is employed for the hydroxyl-containing copolymer.

31. The coating composition of claim 19, wherein one or more vinyl compounds of the formula

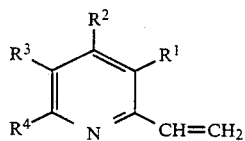 (IIa)

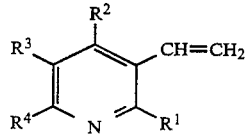 (IIIa)

or

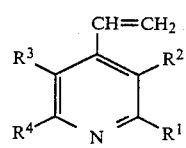 (IVa)

where $R^1$, $R^2$, $R^3$ and $R^4$ have the same meanings as $R^1$, $R^2$ and $R^3$ in formula (Ia) of claim 11, and furthermore $R^3$ and $R^4$ or $R^2$ and $R^3$ in formulae (IIa) and (IIIa) or both $R^1$ and $R^2$ and $R^3$ and $R^4$ in formula (IVa), together with the heterocyclic structure, can form a fused six-membered aromatic ring which is unsubstituted or substituted by alkyl of 1 to 4 carbon atoms, halogen or nitro, are used as component (g) of the hydroxyl-containing copolymer.

32. The coating composition of claim 31, wherein 4-vinylpyridine is used as component (g) of the hydroxyl-containing copolymer.

33. The coating composition of claim 31 wherein from 2 to 20% by weight of component (g) is employed for the hydroxyl-containing copolymer.

34. The coating composition of claim 19, wherein the proportions of components (A) and (B) are chosen such that the ratio of the number of equivalents of isocyanate groups which may be partially or completely blocked with CH—, NH— or OH—acidic blocking agents to the number of equivalents of reactive hydroxyl groups is from 0.25:1 to 4:1.

35. The coating composition of claim 19, wherein a monofunctional ketoxime is used as a blocking agent for the polyisocyanate in which none, some or all of the groups are blocked.

36. The coating composition of claim 19, wherein dimethyl ketoxime or methyl ethyl ketoxime is used as a blocking agent for the polyisocyanate.

* * * * *

UNITED STATES PATENT AND TRADEMARK OFFICE
CERTIFICATE OF CORRECTION

PATENT NO. : 4,532,300

DATED : July 30, 1985

INVENTOR(S) : Werner LENZ et al.

It is certified that error appears in the above-identified patent and that said Letters Patent is hereby corrected as shown below:

CLAIM 1: Column 24, line 26, "11" should be --10--.

CLAIM 19: Column 28, line 21, "10D" should be --100--.

Signed and Sealed this

Tenth Day of December 1985

[SEAL]

*Attest:*

DONALD J. QUIGG

*Attesting Officer*     *Commissioner of Patents and Trademarks*